Patented July 3, 1951

2,559,269

UNITED STATES PATENT OFFICE 2,559,269

METHOD FOR PRODUCING INDIGO VAT DYE PASTE

Daniel Zinner, Wilmington, Del., assignor to E. I. du Pont de Nemours & Company, Wilmington, Del., a corporation of Delaware No Drawing. Application May 21, 1949, Serial No. 94,725

5 Claims. (Cl. 260—323)

This invention relates to a process for preparing indigo dyestuff, and is particularly concerned with a method for processing indigo slurry to produce an essentially air-free indigo paste.

In the manufacture of indigo, mixed sodium and potassium phenyl glycines are fused with anhydrous sodium and potassium hydroxides and sodium amide to form indoxyl. The indoxyl is oxidized to indigo by blowing air through an aqueous solution of alkali metal indoxyl. A slurry of precipitated indigo results, from which the indigo is recovered in the form of a paste by filtration. Dry indigo powder may be prepared from the paste, but it is usually more economical for the dyer to use the paste, and paste also has the advantage of being non-dusting. The paste is commonly marketed with a 20% indigo content.

A difficulty is encountered with indigo paste prepared in the above manner which has troubled the industry for many years. The formation and precipitation of indigo particles in the presence of air results in occlusion of air in the particles. The occluded air is not removed during the usual processing steps of filtering the alkaline indigo slurry and washing the resulting filter cake. Air remains in the indigo particles until released during reduction in preparing the dye vat, at which time the release of air causes objectionable frothing and foaming. This foam interferes, for example, with measurement of the charge and accumulates with successive charges to cause overflowing.

The density of a given concentration of paste is a measure of the presence of air. A 20% indigo paste prepared as above will have a density of only 0.8 to 0.9 gram per cubic centimeter, whereas a non-frothing, essentially air-free paste will have the high density of 1.06 to 1.08 at the same concentration.

One well-known method of removing occluded air is to make a dilute slurry of the filter cake in water, acidify the slurry, then refilter to recover the indigo as a paste, and rewash. This operation, while producing a satisfactory paste, requires an expensive installation of tanks and filter presses, and adds considerably to the cost of the product. Incorporation of various substances, such as gums, glues, casein and dextrin, in the indigo paste has also been suggested to help reduce foaming, but the difficulty is not solved satisfactorily unless occluded air is removed from the indigo.

It is an object of the present invention to provide a simple and economical method for processing a slurry of indigo, resulting from air oxidation of an aqueous solution of the alkaline melt of indoxyl obtained by fusion of sodium and potassium phenyl glycines with anhydrous sodium and potassium hydroxides and sodium amide, to produce a high density, essentially air-free, non-frothing indigo paste. Other objects and advantages of the invention will become apparent from the following description and claims.

In accordance with the present invention an unexpectedly simple and economical method of producing high density, essentially air-free indigo paste is provided. The objects of the invention are accomplished by a method which comprises filtering the alkaline-water slurry of indigo, passing water through the resulting filter cake until it is washed essentially free from alkali, passing steam through the filter cake until displaceable water is removed from the cake, and then adding water to the cake to produce an indigo paste of the desired concentration.

It is not necessary for the filter cake to be steamed until dry, as objectionable air will be removed by the time displaceable water has been removed, and for economical reasons it is desirable to stop the steaming while the cake is still moist. The costs of drying the filter cake and then making a 20% paste from the powder would be prohibitive. The control necessary for stopping the steaming process at an economical moisture content is automatically provided by the present invention.

By the simple step of steaming the filter cake an essentially air-free product is obtained which does not froth or foam in the dye bath. The simplicity of the method is surprising in view of the many years during which the industry was unable to find a solution to the difficulty which was both satisfactory and economical. Steaming the filter cake has also been found to remove the last traces of impurities, the purity of typical batches being increased from about 97% to 99.5% indigo based on the solids content of the cake.

The practice of the invention is illustrated by the following specific example but it is understood that changes may be made therein without departing from the scope of the invention as defined in the appended claims:

An alkaline-water solution of indoxyl, prepared as described in Example 1 of United States Patent No. 2,020,387, issued November 12, 1935, to W. R. Waldron, is oxidized by passing air through the solution with agitation. The resulting slurry of insoluble indigo formed is pumped into a filter press, and the filter cake of recovered indigo is washed alkali-free by running water through the cake in the press. After washing, steam is blown into the press until displaceable water is removed and only steam escapes from every spigot of the press. This steaming operation removes essentially all of the air and increases the density of a 20% paste prepared from the press cake from approximately 0.85 to approximately 1.06 grams per cubic centimeter. The product does not froth of foam in dye vats. In order to cool the press cake after steaming, to facilitate handling, cold water may be run through the press cake, the excess water then being blown out with air. This cooling and air blowing after steaming does not noticeably affect the high density of the indigo paste or cause air to be occluded.

After cooling, the press cake may be charged into a mixer for standardization to the desired concentration. In the mixer the product is mixed with water in accordance with the usual procedure for preparing a paste of the required concentration for commercial use. Care must be taken to avoid stirring air into the paste. In view of the fact that occluded air could not be blown back into the steamed press cake, it was quite surprising to find that occluded air could be mixed into the press cake under some conditions of agitation. Following the steaming treatment, however, it has been found that, regardless of the type of agitation employed in subsequent manufacture, the presence in the paste of a small amount of a non-foaming dispersing agent, such as 0.25% of a water-soluble salt of a formaldehyde condensation product of naphthalene-8-sulfonic acid, will help to prevent air from being beaten back into the paste. A further action of the dispersing agent is to thin the indigo paste so that it is possible to manufacture a free-pouring paste having the desired properties enumerated above.

By the present invention a simple and economical process is provided for producing a high density, essentially air-free indigo paste which does not froth or foam when used in preparing dye baths in the usual manner. The steaming process also removes remaining traces of impurities, making possible the production of highly purified indigo.

As different embodiments of this invention may be made without departing from the spirit and scope thereof, it is to be understood that the invention is not limited to the specific embodiments disclosed except as defined in the appended claims.

In accordance with the above description the following is claimed as my new and useful invention:

1. The method of producing a high density, essentially air-free indigo paste, which will not cause objectionable froth or foam when dye baths are prepared, from a water slurry of indigo containing occluded air which comprises filtering the slurry to produce a filter cake of indigo, passing steam through the filter cake until substantially all of the occluded air is removed as indicated by cessation of flow of water from the cake into the filtrate, and then adding water to the filter cake to produce an indigo paste of desired concentration.

2. The method of producing a high density, essentially air-free indigo paste, which will not cause objectionable froth or foam when dye baths are prepared, from a slurry of indigo obtained by air-oxidation of an alkaline-water solution of indoxyl which comprises filtering the slurry to produce a filter cake of indigo, passing steam through the filter cake until substantially all of the occluded air is removed, and then adding water to the filter cake to produce an indigo paste of desired concentration.

3. The method of producing a high density, essentially air-free indigo paste, which will not cause objectionable froth or foam when dye baths are prepared, from a slurry of indigo obtained by air-oxidation of an alkaline-water solution of indoxyl which comprises filtering the slurry to produce a filter cake of indigo, passing water through the filter cake until the cake is washed essentially free from alkali, passing steam through the filter cake until substantially all of the occluded air is removed, and then adding water to the filter cake to produce an indigo paste of desired concentration.

4. The method of producing a high density, essentially air-free indigo paste, which will not cause objectionable froth or foam when dye baths are prepared, from a slurry of indigo obtained by air-oxidation of an alkaline-water solution of indoxyl which comprises filtering the slurry to produce a filter cake, passing steam through the filter cake until substantially all of the occluded air is removed and the density of a 20% paste of the indigo is increased to approximately 1.06 grams per cubic centimeter, and then adding water to the filter cake to produce an indigo paste of desired concentration.

5. The method of producing a high density, essentially air-free indigo paste, which will not cause objectionable froth or foam when dye baths are prepared, which comprises producing a slurry of indigo by passing air with agitation through an alkaline-water solution of indoxyl obtained by fusion of sodium and potassium phenyl glycines with anhydrous sodium and potassium hydroxides and sodium amide, filtering the slurry to produce a filter cake of indigo, passing water through the filter cake to remove alkali, passing steam through the filter cake until substantially all of the occluded air is removed and the density of a 20% paste of indigo is increased to approximately 1.06 grams per cubic centimeter, and then adding water to the filter cake to produce an indigo paste of desired concentration.

DANIEL ZINNER.

REFERENCES CITED

The following references are of record in the file of this patent:

UNITED STATES PATENTS

| Number | Name | Date |
|---|---|---|
| 1,693,417 | Wait | Nov. 27, 1928 |
| 1,800,965 | Spalding | Apr. 14, 1931 |